(12) United States Patent
Park

(10) Patent No.: US 10,379,600 B2
(45) Date of Patent: Aug. 13, 2019

(54) METHOD OF MODIFYING A POWER MESH

(71) Applicant: SAMSUNG ELECTRONICS CO., LTD., Suwon-si, Gyeonggi-do (KR)

(72) Inventor: Jin-Young Park, Uiwang-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 173 days.

(21) Appl. No.: 15/369,077

(22) Filed: Dec. 5, 2016

(65) Prior Publication Data

US 2017/0168554 A1    Jun. 15, 2017

(30) Foreign Application Priority Data

Dec. 14, 2015 (KR) ......................... 10-2015-0177870

(51) Int. Cl.
*G06F 17/50* (2006.01)
*G06F 9/455* (2018.01)
*G06F 1/3296* (2019.01)

(52) U.S. Cl.
CPC .................................. *G06F 1/3296* (2013.01)

(58) Field of Classification Search
CPC .. G06F 1/3296; G06F 17/5045; G06F 17/505; G06F 17/5068; G06F 2217/78; G06F 1/3202; H01L 22/12; H01L 23/528; H01L 23/5286; H01L 27/0203; H01L 27/0611; H01L 29/06
See application file for complete search history.

(56) References Cited

U.S. PATENT DOCUMENTS

| | | | |
|---|---|---|---|
| 6,492,205 B1 * | 12/2002 | Liu | H01L 23/5286 257/E23.153 |
| 6,710,371 B2 | 3/2004 | Kitahara et al. | |
| 6,818,929 B2 | 11/2004 | Tsutsumi et al. | |
| 6,925,627 B1 | 8/2005 | Longway et al. | |
| 7,603,641 B2 | 10/2009 | Lin | |
| 8,063,416 B2 | 11/2011 | Kishishita | |
| 8,347,253 B2 | 1/2013 | Kumagai et al. | |
| 8,566,776 B2 | 10/2013 | Qiu | |
| 2003/0094661 A1 * | 5/2003 | Miyagi | H01L 27/11807 257/391 |
| 2006/0181307 A1 | 8/2006 | Shibayashi et al. | |
| 2006/0239102 A1 | 10/2006 | Saita et al. | |
| 2014/0210079 A1 | 7/2014 | Chuang et al. | |
| 2016/0085897 A1 * | 3/2016 | Jeong | G06F 17/5068 716/122 |

* cited by examiner

*Primary Examiner* — Vuthe Siek

(74) *Attorney, Agent, or Firm* — F. Chau & Associates, LLC

(57) ABSTRACT

A method of modifying a power mesh includes measuring distances between end cap blocks included in a standard cell in a chip sub-block. The end cap blocks are located at edges of the chip sub-block and edges of the macro cell. The method includes searching a logic circuit block located between the first and second end cap blocks of the end cap blocks. A distance between the first and second end cap blocks is shorter than a predetermined length. It is determined whether a power supply voltage line and a ground voltage line exist at a partial region of the first power mesh layer. When the power supply voltage line or the ground voltage line is determined not to exist at the partial region, the power mesh data are modified to supplement the power supply voltage line or the ground voltage line at the partial region.

19 Claims, 16 Drawing Sheets

METHOD OF MODIFYING A POWER MESH

CROSS-REFERENCE TO RELATED APPLICATION

This U.S. non-provisional application claims the benefit of priority under 35 U.S.C. § 119 to Korean Patent Application No. 10-2015-0177870 filed on Dec. 14, 2015 in the Korean Intellectual Property Office (KIPO), the disclosure of which is incorporated by reference herein in its entirety.

TECHNICAL FIELD

Exemplary embodiments of the present inventive concept relate to power meshes, and more particularly to a method of modifying power meshes.

DISCUSSION OF RELATED ART

In semiconductor processing, the number of transistors or circuits included in a semiconductor chip has been increased. Accordingly, in a case where many transistors or circuits are included in a relatively small region of a semiconductor chip, the semiconductor chip may have a power-weak region where sufficient power is not supplied. In a process of forming a semiconductor chip, power-planning which configures a power mesh is performed generally after floor-planning which determines locations of standard cells and macro cells. However, a relatively low power level at the power-weak region may be found when forming the semiconductor chip. Thus, when a relatively low power level at the power-weak region is found, the floor-planning of the semiconductor chip may be repeated, or a power increasing work may be performed, which may increase manpower, time and manufacturing expenses.

SUMMARY

Some exemplary embodiments of the present inventive concept provide a method of modifying a power mesh at a power-weak region of a semiconductor chip.

According to some exemplary embodiments of the present inventive concept, a method of modifying a power mesh includes measuring distances between end cap blocks included in a standard cell based on location data for a macro cell and the standard cell in a chip sub-block. The chip sub-block includes a substrate layer, a signal connection layer and first through N-th power mesh layers. N is a natural number. The end cap blocks are located at edges of the chip sub-block and edges of the macro cell. The method includes searching a logic circuit block located between the first and second end cap blocks of the end cap blocks. A distance between the first and second end cap blocks is shorter than a predetermined length. It is determined whether a power supply voltage line and a ground voltage line exist at a partial region of the first power mesh layer above the searched logic circuit block based on power mesh data representing a voltage line structure in the first through N-th power mesh layers. When the power supply voltage line or the ground voltage line is determined not to exist at the partial region, the power mesh data are modified to supplement the power supply voltage line or the ground voltage line at the partial region.

According to some exemplary embodiments of the present inventive concept, a method of modifying a power mesh includes measuring distances between end cap blocks included in a standard cell are measured based on location data for a macro cell and the standard cell in a chip sub-block. The chip sub-block includes a substrate layer, a signal connection layer and first through N-th power mesh layers. N is a natural number. The end cap blocks are located at edges of the chip sub-block and edges of the macro cell. The method includes searching a logic circuit block located between the first and second end cap blocks of the end cap blocks. A distance between the first and second end cap blocks is shorter than a predetermined length. It is determined whether a power supply voltage line and a ground voltage line exist at a partial region of the first power mesh layer above the searched logic circuit block based on power mesh data representing a voltage line structure in the first through N-th power mesh layers. When the power supply voltage line or the ground voltage line is determined not to exist at the partial region, the power mesh data are modified to supplement the power supply voltage line or the ground voltage line at the partial region. When the searched logic circuit block includes a header cell that generates a virtual power supply voltage, a virtual power supply voltage line for applying the virtual power supply voltage is supplemented in the signal connection layer included in the searched logic circuit block.

In a method of modifying the power mesh according to an exemplary embodiment of the present inventive concept, a possible power-weak region may be searched by measuring the distances between the end cap blocks located at the edges of a chip (e.g., a full-chip or a chip sub-block) and the edges of the macro cell. The power supply voltage line or the ground voltage line may be modified or added at the region of the lowest power mesh layer above the logic circuit block in the possible power-weak region. The virtual power supply voltage line may be modified or added in the signal connection layer included in the logic circuit block, thus supplying sufficient power to the entire chip sub-block or the entire full-chip.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EMBODIMENTS

Figure 1:
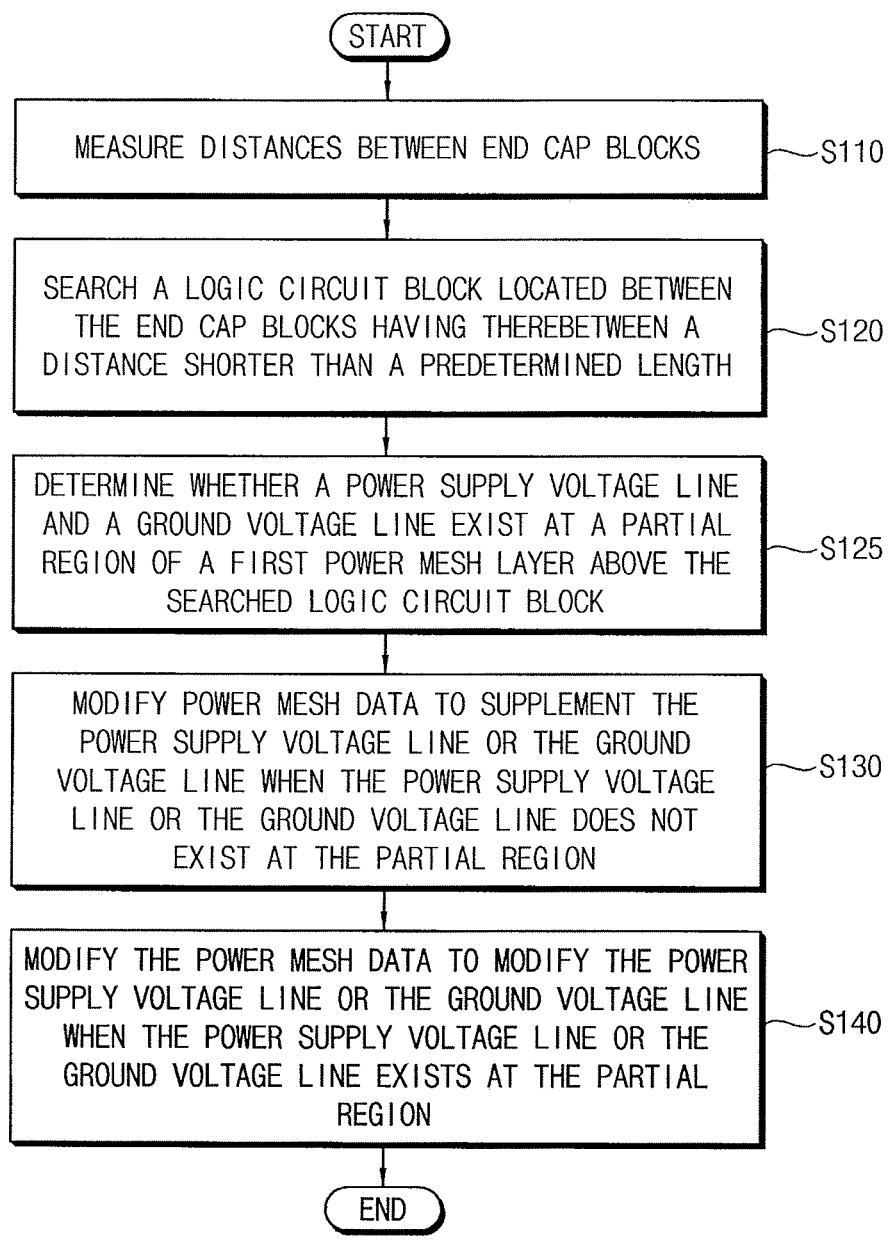
FIG. 1 is a flowchart illustrating a method of modifying a power mesh according to one or more exemplary embodiments of the present inventive concept.

Various exemplary embodiments of the present inventive concept will be described more fully hereinafter with reference to the accompanying drawings, in which some exemplary embodiments are shown. The present inventive concept may, however, be embodied in many different forms and should not be construed as limited to the exemplary embodiments set forth herein. Like reference numerals may refer to like elements throughout the specification and drawings.

It will be understood that, although the terms first, second, etc. may be used herein to describe various elements, these elements should not be limited by these terms.

It will be understood that when an element is referred to as being "connected" or "coupled" to another element, it may be directly connected or coupled to the other element or intervening elements may be present.

FIG. 1 is a flowchart illustrating a method of modifying a power mesh according to one or more exemplary embodiments of the present inventive concept.

Referring to FIG. 1, in a method of modifying a power mesh for a chip sub-block (or a full-chip) including a substrate layer, a signal connection layer and first through N-th power mesh layers, where N is a natural number, distances between end cap blocks included in a standard cell may be measured (S110). The distances between the end cap blocks may be measured based on location data for a macro cell and the standard cell in the chip sub-block. The end cap blocks may be located at edges of the chip sub-block and edges of the macro cell. A logic circuit block located between the end cap blocks having therebetween a distance shorter than a predetermined length may be searched (S120). It is determined whether a power supply voltage line and a ground voltage line exist at a partial region of the first power mesh layer above the searched logic circuit block (S125). The determination of whether a power supply voltage line and a ground voltage line exist at a partial region of the first power mesh layer above the searched logic circuit block may be based on power mesh data representing a voltage line structure in the first through N-th power mesh layers. When the power supply voltage line or the ground voltage line does not exist at the partial region, the power mesh data may be modified to supplement the power supply voltage line or the ground voltage line at the partial region (S130).

In some exemplary embodiments of the present inventive concept, when the power supply voltage line or the ground voltage line exists at the partial region, the power mesh data may be modified to modify the power supply voltage line or the ground voltage line at the partial region (S140).

Figure 2:
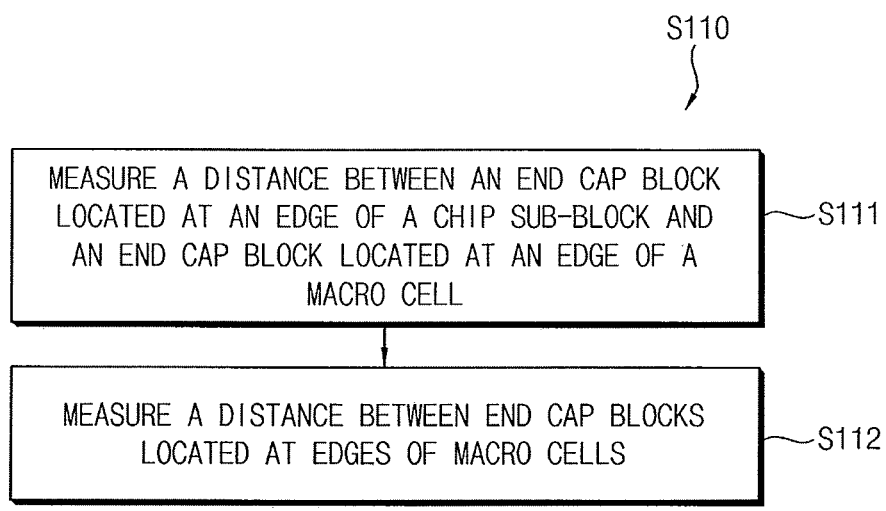
FIG. 2 is a flowchart illustrating an example of a step of measuring distances between end cap blocks included in the method of FIG. 1.

FIG. 2 is a flowchart illustrating an example of a step of measuring distances between end cap blocks included in the method of FIG. 1.

Referring to FIG. 2, to measure the distances between the end cap blocks (S110), a distance between the end cap block located at the edge of the chip sub-block and the end cap block located at the edge of the macro cell may be measured (S111), and a distance between the end cap blocks located at the edges of the macro cells may be measured (S112). The steps (S111 and S112) of measuring the distances will be described in more detail below with reference to FIG. 7.

Figure 3:
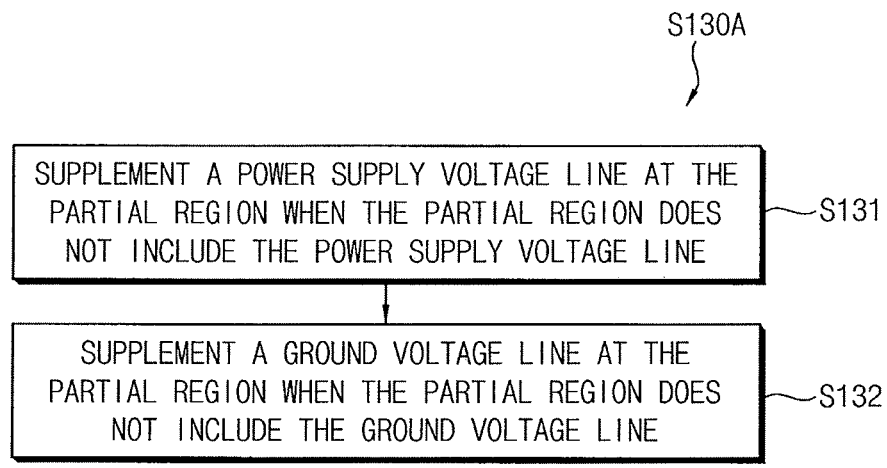
FIGS. 3 through 5 are flowcharts illustrating examples of a step of modifying power mesh data to supplement a power supply voltage line or a ground voltage line at a partial region included in the method of FIG. 1.
Figure 4:
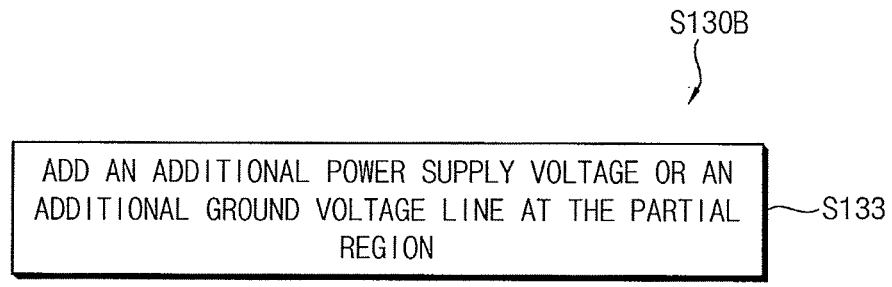
Figure 5:
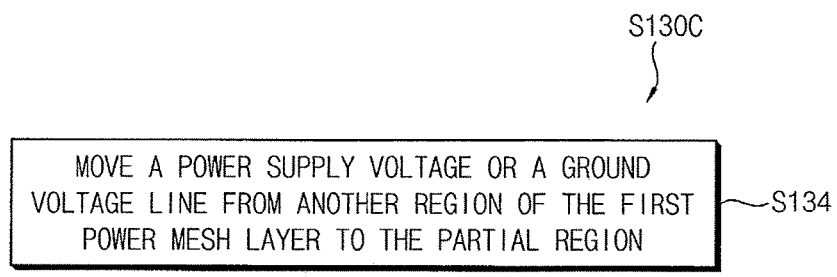

FIGS. 3 through 5 are flowcharts illustrating examples of a step of modifying power mesh data to supplement a power supply voltage line or a ground voltage line at a partial region included in the method of FIG. 1.

Referring to FIG. 3, to modify the power mesh data to supplement/modify the power supply voltage line or the ground voltage line at the partial region (S130A), a power supply voltage line may be supplemented at the partial region when the partial region does not include the power supply voltage line (S131), and the ground voltage line may be supplemented at the partial region when the partial region does not include the ground voltage line (S132). The steps (S131 and S132) will be described in more detail below with reference to FIGS. 10 and 11.

Referring to FIG. 4, to modify the power mesh data to supplement the power supply voltage line or the ground voltage line at the partial region (S130B), an additional power supply voltage line or an additional ground voltage line may be added at the partial region (S133). The step (S133) of adding the additional power supply voltage line or the additional ground voltage line at the partial region will be described in more detail below with reference to FIG. 10.

Referring to FIG. 5, to modify the power mesh data to supplement the power supply voltage line or the ground voltage line at the partial region (S130C), the power supply voltage line or the ground voltage line located at another region of the first power mesh layer may be moved from the another region to the partial region (S134). The step (S134) of moving the power supply voltage line or the ground voltage line from the another region to the partial region will be described in more detail below with reference to FIG. 11.

Figure 6:
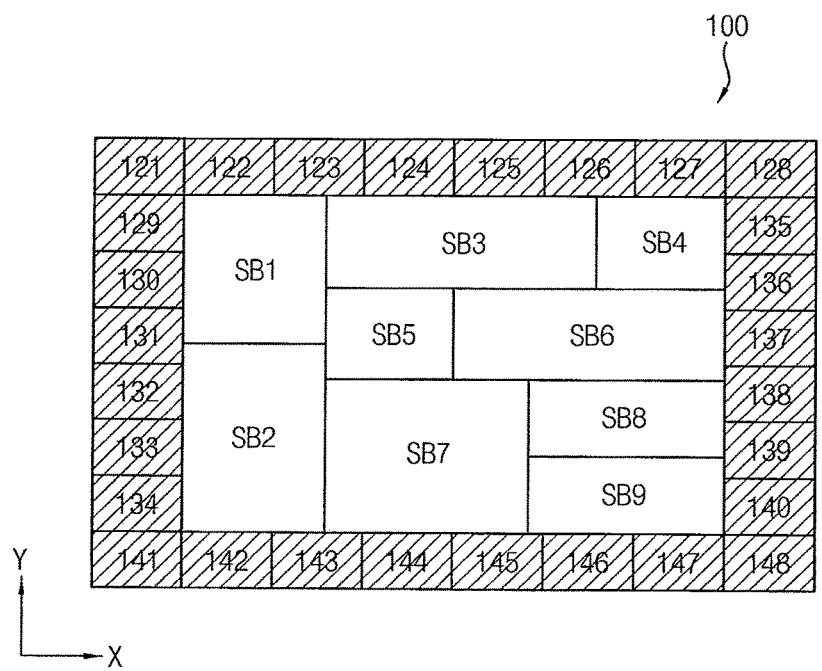
FIG. 6 is a plan view illustrating an integrated circuit chip.

FIG. 6 is a plan view illustrating an integrated circuit chip.

Referring to FIG. 6, an integrated circuit chip 100 may include a plurality of input/output (I/O) pads 121 through 148 and a plurality of chip sub-blocks SB1 through SB9 disposed on an X-Y plane. The integrated circuit chip 100 may include twenty eight I/O pads 121 through 148 and nine chip sub-blocks SB1 through SB9, the number of eight I/O pads and the number of chip sub-blocks included in the integrated circuit chip are not limited thereto, and any desired number of I/O pads and chip sub-blocks may be included in the integrated circuit chip 100 according to exemplary embodiments of the present inventive concept.

The I/O pads 121 through 148 may receive external signals, and may transfer the received signals to the integrated circuit chip 100. The integrated circuit chip 100 may include tens or hundreds of millions of transistors, and thus the integrated circuit chip 100 may be developed on a chip sub-block basis, and the developed chip sub-blocks SB1 through SB9 may be combined to form the integrated circuit chip 100.

Figure 7:
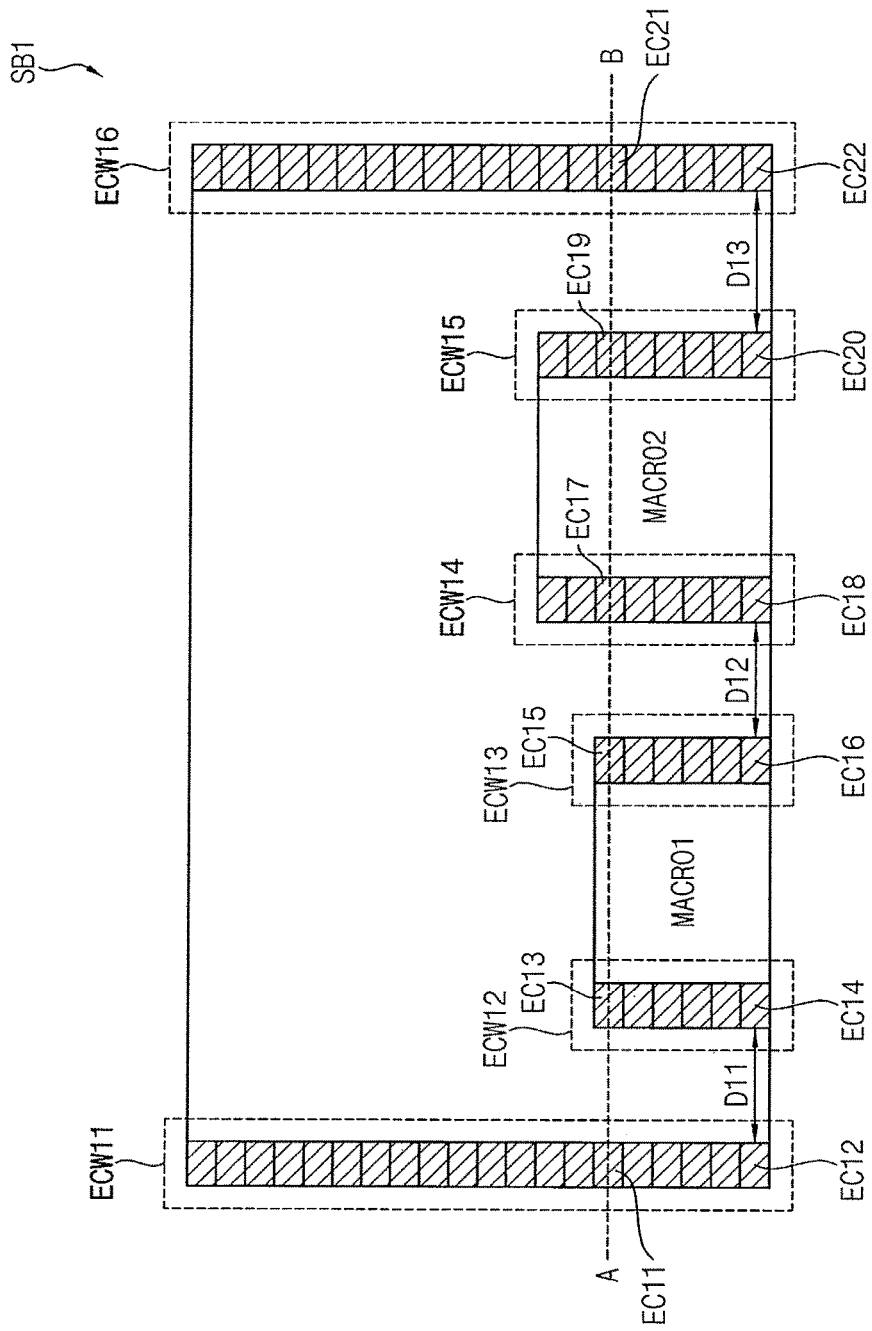
FIG. 7 is a plan view illustrating a first chip sub-block included in an integrated circuit chip of FIG. 6.

FIG. 7 is a plan view illustrating a first chip sub-block included in an integrated circuit chip of FIG. 6. Structures of second through ninth chip sub-blocks SB2 through SB9 will be understood based on the following description for the first chip sub-block SB1, and thus duplicative descriptions for the second through ninth chip sub-blocks SB2 through SB9 may be omitted.

Referring to FIG. 7, the first chip sub-block SB1 may include a first macro cell MACRO1 and a second macro cell MACRO2. The first chip sub-block SB1 may include two macro cells MACRO1 and MACRO2; however, the number of macro cells included in the chip sub-block is not limited thereto. The first chip sub-block SB1 may include any desired number of macro cells according to exemplary embodiments of the present inventive concept. Each macro cell MACRO1 and MACRO2 may be a memory cell, a digital intellectual property (IP) or an analog IP. For example, the analog IP may be a phase locked loop (PLL) cell.

A standard cell may be disposed between edges of the first chip sub-block SB1 and edges of the adjacent macro cells MACRO1 and MACRO2. The standard cell may include logic circuit blocks and end cap blocks EC11 through EC22. In some exemplary embodiments of the present inventive concept, each end cap block EC11 through EC22 may be an end cap. A first end cap block wall ECW11 including first and second end cap blocks EC11 and EC12 may be located a left edge of the first chip sub-block SB1, and a sixth end cap block wall ECW16 including eleventh and twelfth end cap blocks EC21 and EC22 may be located a right edge of the first chip sub-block SB1. A second end cap block wall ECW12 including third and fourth end cap blocks EC13 and EC14 may be located a left edge of the first macro cell MACRO1, and a third end cap block wall ECW13 including fifth and sixth end cap blocks EC15 and EC16 may be located a right edge of the first macro cell MACRO1. A fourth end cap block wall ECW14 including seventh and eighth end cap blocks EC17 and EC18 may be located a left edge of the second macro cell MACRO2, and a fifth end cap block wall ECW15 including ninth and tenth end cap blocks EC19 and EC20 may be located a right edge of the second macro cell MACRO2.

In some exemplary embodiments of the present inventive concept, in the step of measuring the distance between the end cap block located at the edge of the chip sub-block and the end cap block located at the edge of the macro cell (S111), a first distance D11 between the second end cap block EC12 and the fourth end cap block EC14 may be measured, and a third distance D13 between the tenth end cap block EC20 and the twelfth end cap block EC22 may be measured. In some exemplary embodiments of the present inventive concept, in the step of measuring the distance between the end cap blocks located at the edges of the macro cells (S112), a second distance D12 between the sixth end cap block EC16 and the eighth end cap block EC18 may be measured.

Figure 8:
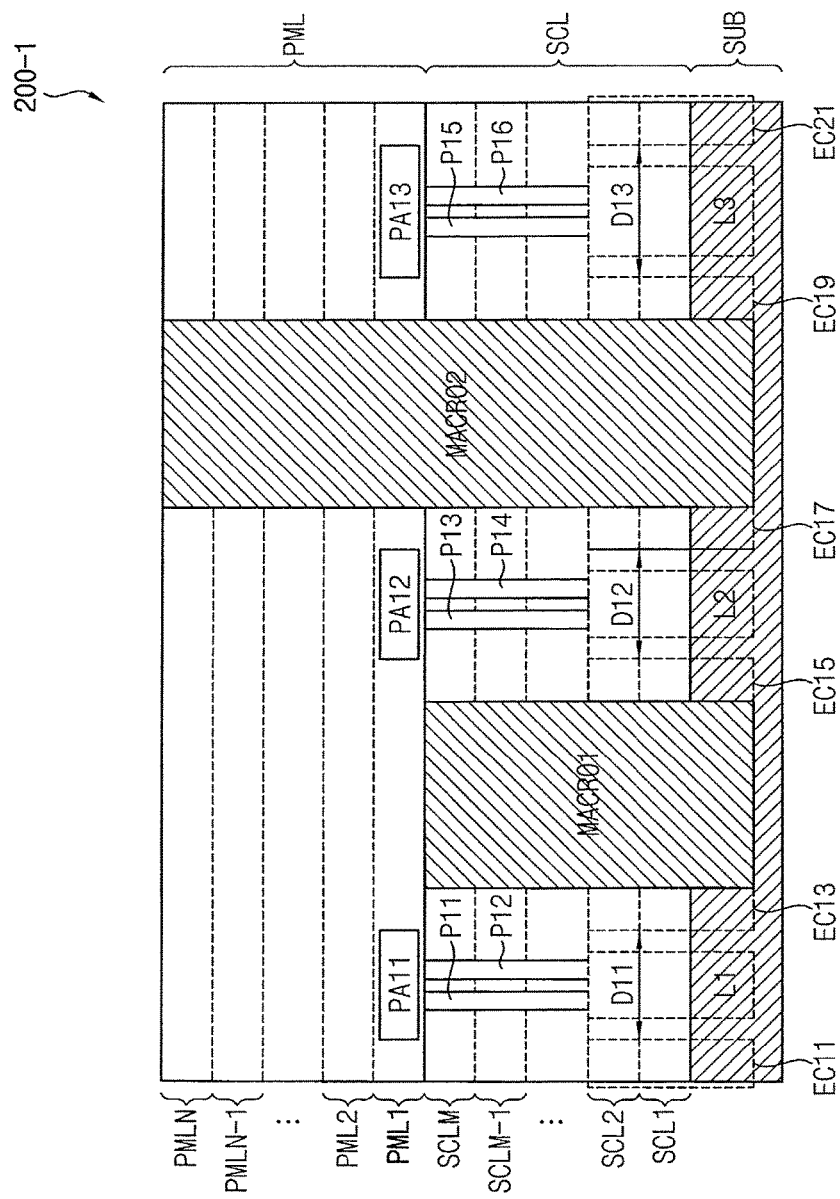
FIG. 8 is a cross-sectional view of an example of a first chip sub-block taken along a line A-B of FIG. 7.

FIG. 8 is a cross-sectional view of an example of a first chip sub-block taken along a line A-B of FIG. 7.

Referring to FIG. 8, a first chip sub-block 200-1 may include a substrate layer SUB, a signal connection layer SCL and a power mesh layer PML. The signal connection layer SCL may include first through M-th signal connection layers SCL1, SCL2, SCLM-2 and SCLM, where M is a natural number, and the power mesh layer PML may include first through N-th power mesh layers PML1, PML2, PMLN-1 and PMLN. An (L+1)-th signal connection layer may be located on an L-th signal connection layer, where L is a natural number less than M. The first power mesh layer PML1 may be located on the M-th signal connection layer SCLM. A (K+1)-th power mesh layer may be located on a K-th power mesh layer, where K is a natural number less than N.

Power supply voltage lines included in the first through N-th power mesh layers PML1, PML2, PMLN-1 and PMLN may be connected to each other through first vias, and ground voltage lines included in the first through N-th power mesh layers PML1, PML2, PMLN-1 and PMLN may be connected to each other through second vias.

Each macro cell MACRO1 and MACRO2 may be a memory cell, a digital IP or an analog IP. In some exemplary embodiments of the present inventive concept, the analog IP may be a PLL cell. First and second macro cells MACRO1 and MACRO2 may be included in the substrate layer SUB, the signal connection layer SCL and the power mesh layer PML, and may have a predetermined internal signal connection structure. In some exemplary embodiments of the present inventive concept, in a case where the first macro cell MACRO1 is the memory cell, the first macro cell MACRO1 are included in the substrate layer SUB and the signal connection layer SCL. In some exemplary embodiments of the present inventive concept, in a case where the second macro cell MACRO2 is the memory cell, the second macro cell MACRO2 may be included in the substrate layer SUB, the signal connection layer SCL and the power mesh layer PML.

A standard cell may include logic circuit blocks L1, L2 and L3 and end cap blocks EC11, EC13, EC15, EC17, EC19 and EC21. Each of the logic circuit blocks L1, L2 and L3 and the end cap blocks EC11, EC13, EC15, EC17, EC19 and EC21 may be included in the substrate layer SUB and the signal connection layer SCL. The logic circuit blocks L1, L2 and L3 and the end cap blocks EC11, EC13, EC15, EC17, EC19 and EC21 may be included in the substrate layer SUB and the first and second signal connection layers SCL1 and SCL2, each block L1, L2, L3, EC11, EC13, EC15, EC17, EC19 and EC21 may be included in the substrate layer SUB and at least one signal connection layer SCL1, SCL2, SCLM-2 and SCLM. The standard cell may transmit or receive signals to or from another standard cell or the first and second macro cells MACRO1 and MACRO2 through the signal connection layer SCL.

The first end cap block EC11 may increase a size of an N-well region located under the left edge of the first chip sub-block 200-1, the third end cap block EC13 may increase a size of an N-well region located under the left edge of the first macro cell MACRO1, the fifth end cap block EC15 may increase a size of an N-well region located under the right edge of the first macro cell MACRO1, the seventh end cap block EC17 may increase a size of an N-well region located under the left edge of the second macro cell MACRO2, the ninth end cap block EC19 may increase a size of an N-well region located under the right edge of the second macro cell MACRO2, and the eleventh end cap block EC21 may increase a size of an N-well region located under the right edge of the first chip sub-block 200-1.

The first logic circuit block L1 may be connected to power supply voltage lines and ground voltage lines located at a first partial region PA11 of the first power mesh layer PML1 above the first logic circuit block L1 respectively through vias P11 and P12 passing through the signal connection layer SCL. The second logic circuit block L2 may be connected to power supply voltage lines and ground voltage lines located at a second partial region PA12 of the first power mesh layer PML1 above the second logic circuit block L2 through vias P13 and P14 passing respectively through the signal connection layer SCL. The third logic circuit block L3 may be connected to power supply voltage lines and ground voltage lines located at a third partial region PA13 of the first power mesh layer PML1 above the third logic circuit block L3 respectively through vias P15 and P16 passing through the signal connection layer SCL.

In a case where the power supply voltage line or the ground voltage line does not exist at the first partial region PA11, the first logic circuit block L1 may be a power-weak region where sufficient power is not supplied. In a case where the power supply voltage line or the ground voltage line does not exist at the second partial region PA12, the second logic circuit block L2 may be a power-weak region where sufficient power is not supplied. In a case where the power supply voltage line or the ground voltage line does not exist at the third partial region PA13, the third logic circuit block L3 may be a power-weak region where sufficient power is not supplied.

Figure 9:
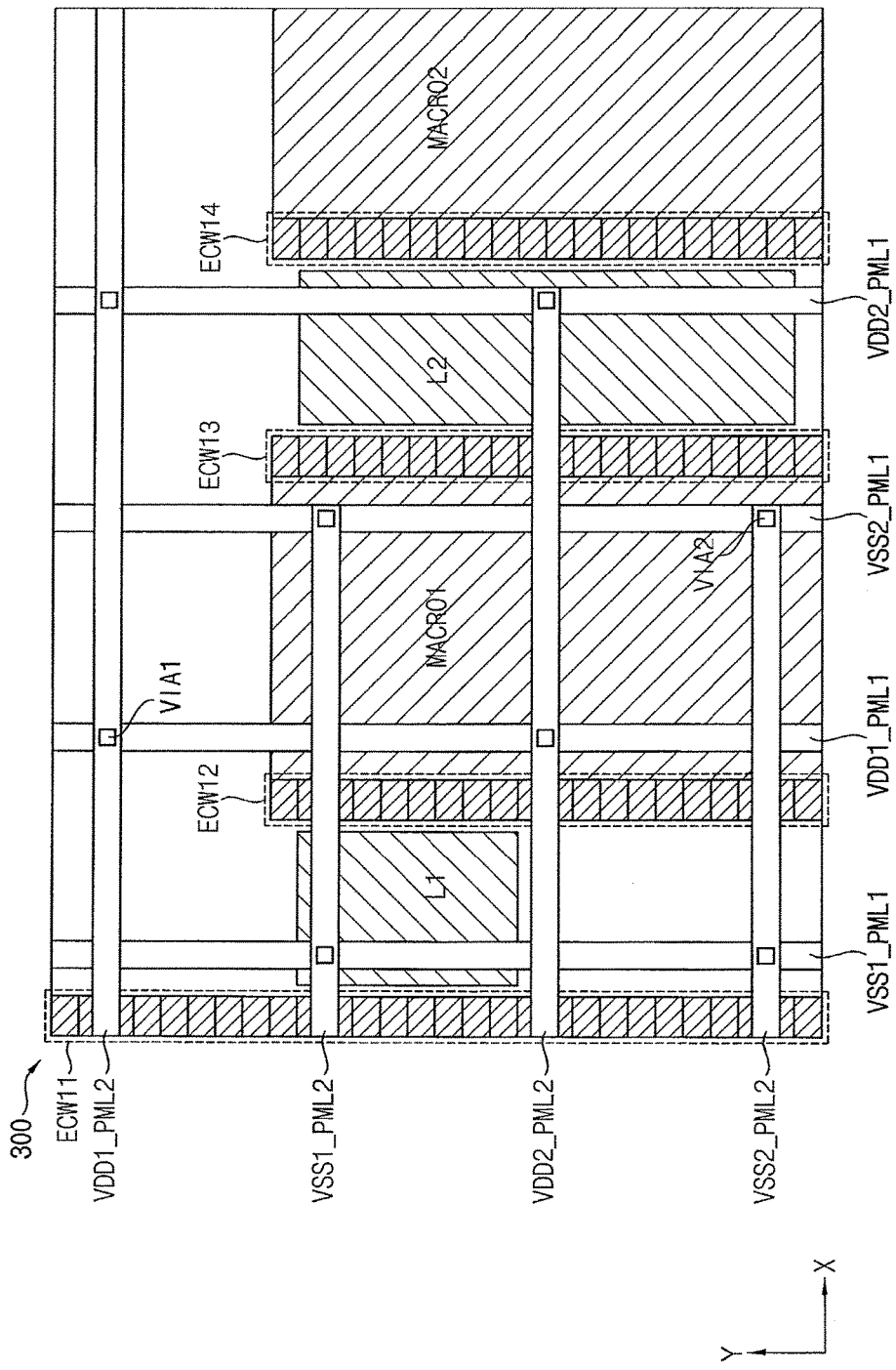
FIG. 9 is a plan view illustrating first and second power mesh layers, a signal connection layer and a substrate layer included in a first chip sub-block of FIG. 7.

FIG. 9 is a plan view illustrating first and second power mesh layers, a signal connection layer and a substrate layer included in a first chip sub-block of FIG. 7.

Referring to FIG. 9, in a chip sub-block 300, a first power mesh layer PML1 may include first and second power supply voltage lines VDD1_PML1 and VDD2_PML1 extending in a Y-axis direction, and may include first and second ground voltage lines VSS1_PML1 and VSS2_PML1 extending in the Y-axis direction. A second power mesh layer PML2 may include third and fourth power supply voltage lines VDD1_PML2 and VDD2_PML2 extending in an X-axis direction, and may include third and fourth ground voltage lines VSS1_PML2 and VSS2_PML2 extending in the X-axis direction. The third and fourth power supply voltage lines VDD1_PML2 and VDD2_PML2 may be connected to the first and second power supply voltage lines VDD1_PML1 and VDD2_PML1 through vias VIA1, and the third and fourth ground voltage lines VSS1_PML2 and VSS2_PML2 may be connected to the first and second ground voltage lines VSS1_PML1 and VSS2_PML1 through vias VIA2.

The second macro cell MACRO2 may extend to the power mesh layer PML, and thus the first and second power mesh layers PML1 and PML2 need not include a power supply voltage line and a ground voltage line at a region corresponding to the second macro cell MACRO2.

The first logic circuit block L1 may directly receive a ground voltage from the first ground voltage line VSS1_PML1 at the first partial region PA11 of the first power mesh layer PML1 through the via P12. However, since the first partial region PA11 above the first logic circuit block L1 might not include the power supply voltage line, the first logic circuit block L1 need not directly receive a power supply voltage.

The second logic circuit block L2 may directly receive a power supply voltage from the second power supply voltage line VDD2_PML1 at the second partial region PA12 of the first power mesh layer PML1 through the via P13. However, since the second partial region PA12 above the second logic circuit block L2 might not include the ground voltage line, the second logic circuit block L2 need not directly receive a ground voltage.

Figure 10:
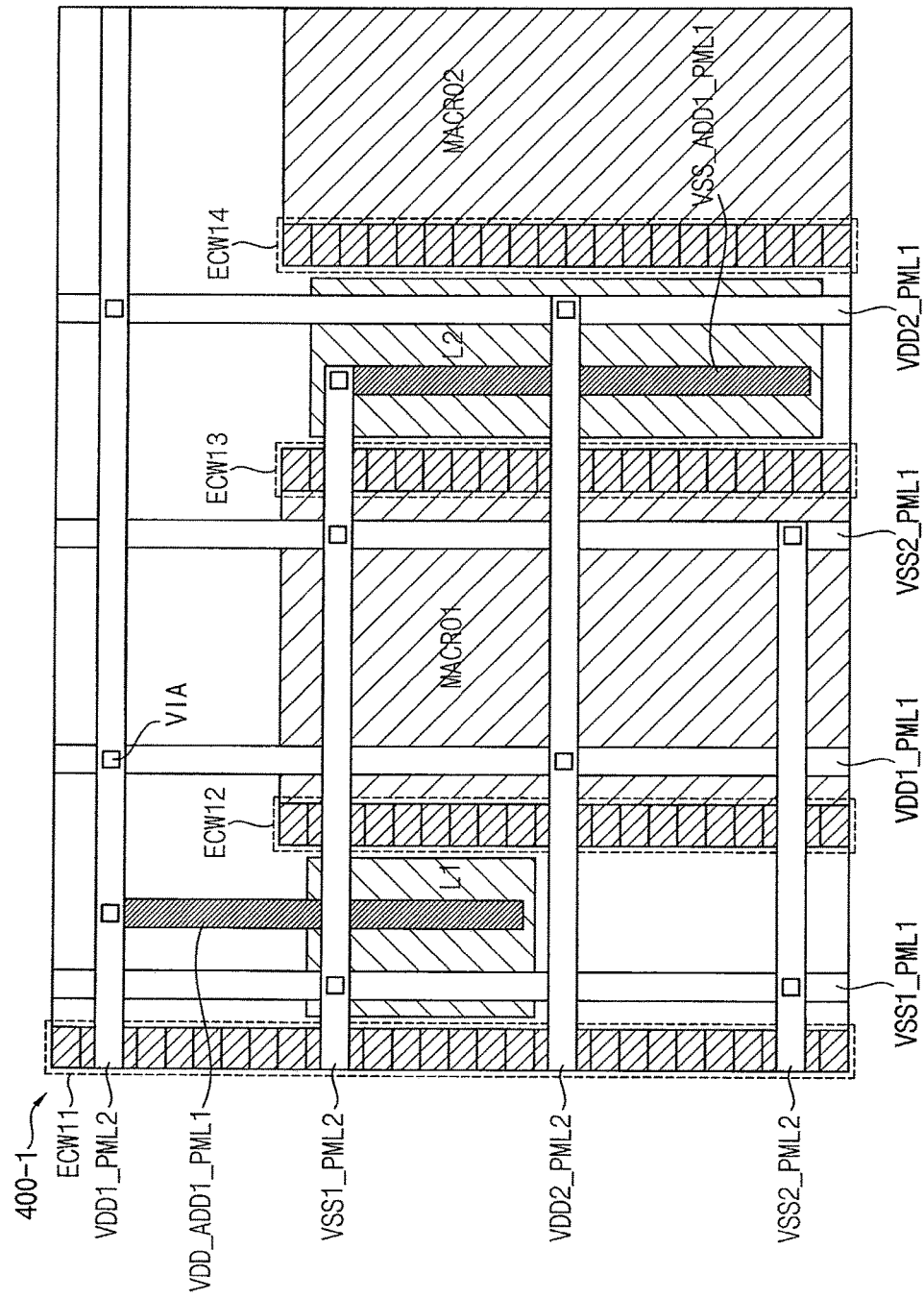
FIG. 10 is a plan view illustrating an example of a first chip sub-block where a power mesh for the first chip sub-block of FIG. 9 is modified.

FIG. 10 is a plan view illustrating an example of a first chip sub-block where a power mesh for the first chip sub-block of FIG. 9 is modified.

Referring to FIG. 10, in some exemplary embodiments of the present inventive concept, in the step of adding the power supply voltage or the ground supply voltage at the partial region (S133), an additional power supply voltage VDD_ADD1_PML1 may be added at the first partial region PA11, and/or an additional ground voltage VSS_ADD1_PML1 may be added at the second partial region PA12. For example, the additional power supply voltage VDD_ADD1_PML1 may be added at the first partial region PA11, and/or the additional ground voltage VSS_ADD1_PML1 may be added at the second partial region PA12 in a first chip sub-block 400-1.

Figure 11:
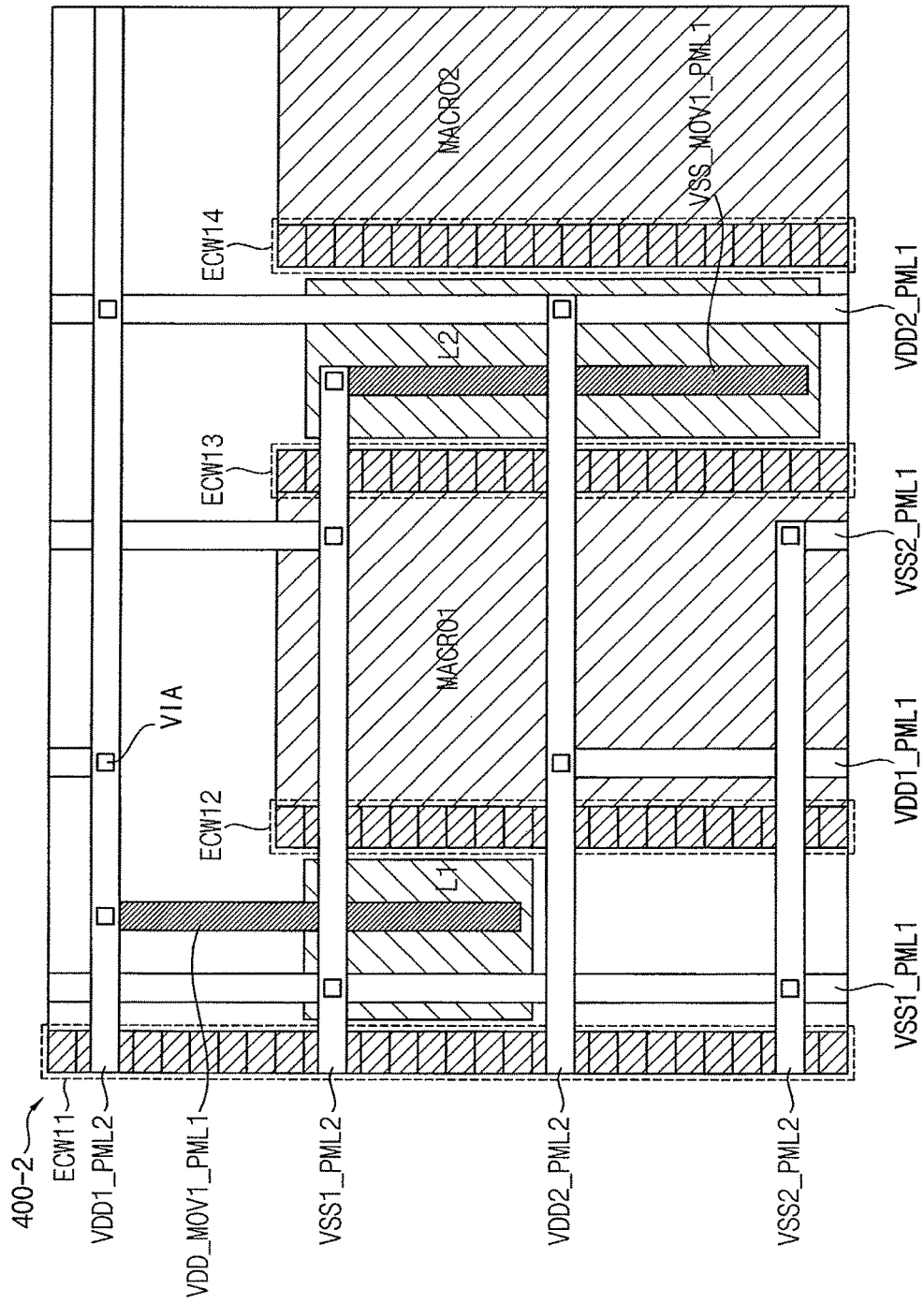
FIG. 11 is a plan view illustrating another example of a first chip sub-block where a power mesh for the first chip sub-block of FIG. 9 is modified.

FIG. 11 is a plan view illustrating another example of a first chip sub-block where a power mesh for the first chip sub-block of FIG. 9 is modified.

Referring to FIG. 11, in some exemplary embodiments of the present inventive concept, in the step of moving the power supply voltage line or the ground voltage line from the another region to the partial region (S134), a portion of the first power supply voltage line VDD1_PML1 located at a region other than the first partial region PA11 may be moved to the first partial region PA11 to form a moved power supply voltage line VDD_MOV1_PML1, and/or a portion of the second ground voltage line VSS2_PML1 located at a region other than the second partial region PA12 may be moved to the second partial region PA12 to form a moved ground voltage line VSS_MOV1_PML1. For example, the moved power supply voltage line VDD_MOV1_PML1, and/or the moved ground voltage line VSS_MOV1_PML1 may be included in a first chip sub-block 400-2.

Figure 12:
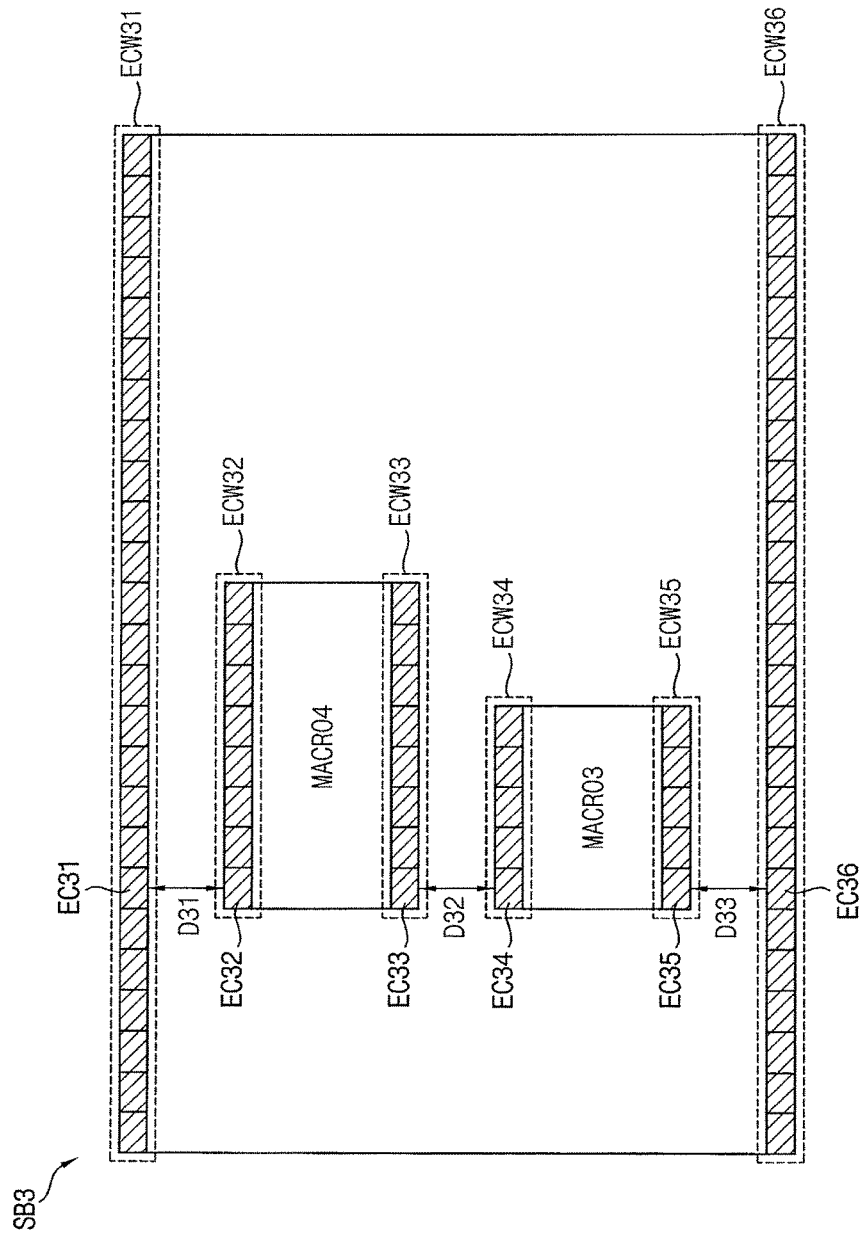
FIG. 12 is a plan view illustrating a third chip sub-block included in an integrated circuit chip of FIG. 6.

FIG. 12 is a plan view illustrating a third chip sub-block included in an integrated circuit chip of FIG. 6.

Referring to FIG. 12, the third chip sub-block SB3 may include a third macro cell MACRO3 and a fourth macro cell MACRO4. The number of macro cells MACRO3 and MACRO4 included in the third chip sub-block SB3 may be varied according to some exemplary embodiments of the present inventive concept. Each macro cell MACRO3 and MACRO4 may be a memory cell, a digital IP or an analog IP. A standard cell may include end cap blocks EC31 through EC36. A first end cap wall ECW31 including a first end cap block EC31 may be located an upper edge of the third chip sub-block SB3, and a sixth end cap wall ECW36 including a sixth end cap block EC36 may be located a lower edge of the third chip sub-block SB3. A second end cap wall ECW32 including a second end cap block EC32 may be located an upper edge of the fourth macro cell MACRO4, and a third end cap wall ECW33 including a third end cap block EC33 may be located a lower edge of the fourth macro cell MACRO4. A fourth end cap wall ECW34 including a fourth end cap block EC34 may be located an upper edge of the third macro cell MACRO3, and a fifth end cap wall ECW35 including a fifth end cap block EC35 may be located a lower edge of the third macro cell MACRO3.

In some exemplary embodiments of the present inventive concept, in the step of measuring the distance between the end cap block located at the edge of the chip sub-block and the end cap block located at the edge of the macro cell (S111), a first distance D31 between the first end cap block EC31 and the second end cap block EC32 may be measured, and a third distance D33 between the fifth end cap block EC35 and the sixth end cap block EC23 may be measured. In some exemplary embodiments of the present inventive concept, in the step of measuring the distance between the end cap blocks located at the edges of the macro cells (S112), a second distance D32 between the third end cap block EC33 and the fourth end cap block EC34 may be measured.

Figure 13:
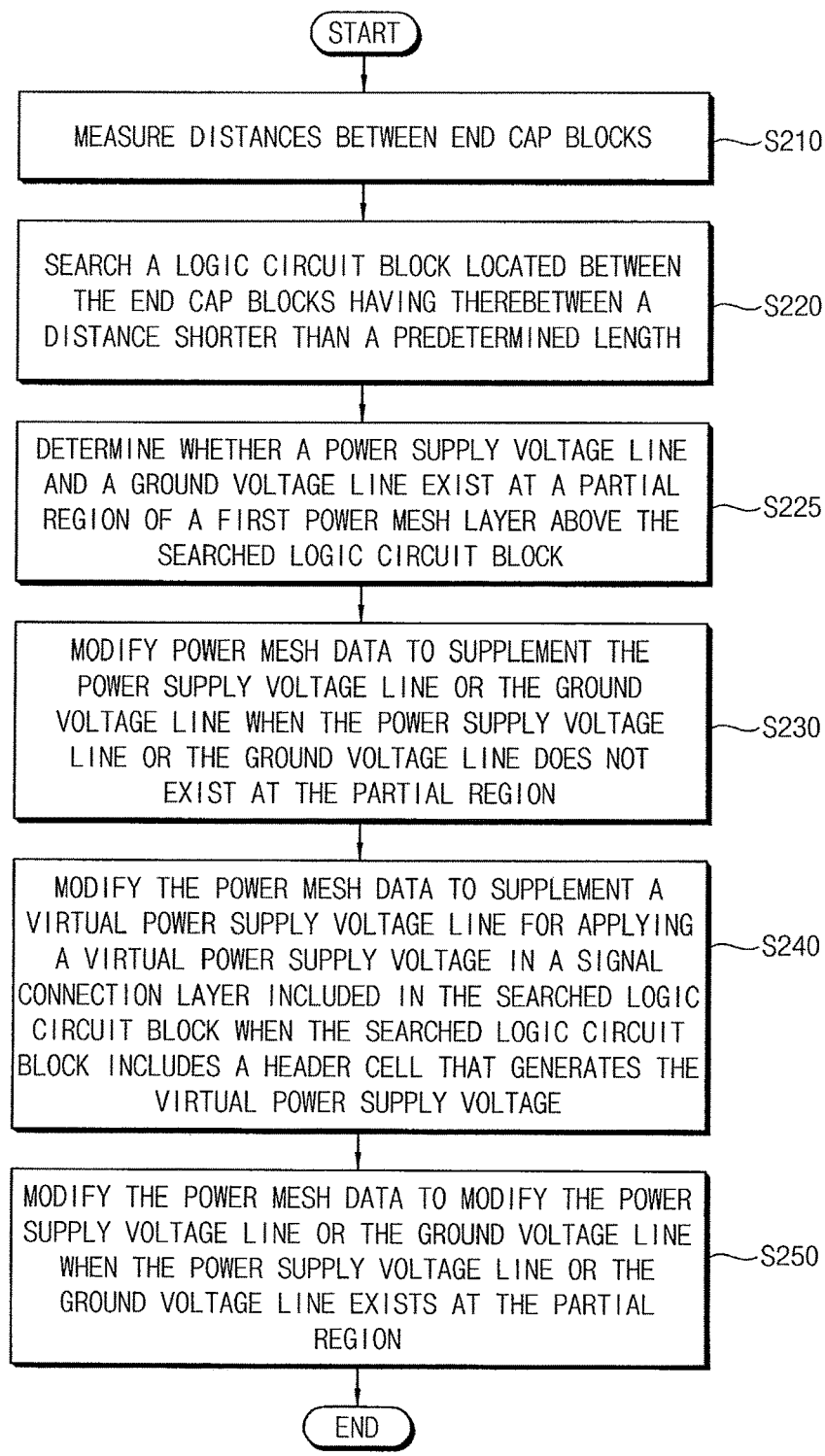
FIG. 13 is a flowchart illustrating a method of modifying a power mesh according to one or more exemplary embodiments of the present inventive concept.

FIG. 13 is a flowchart illustrating a method of modifying a power mesh according to one or more exemplary embodiments of the present inventive concept.

Referring to FIG. 13, in a method of modifying a power mesh for a chip sub-block (or a full-chip) including a substrate layer, a signal connection layer and first through N-th power mesh layers, where N is a natural number, distances between end cap blocks included in a standard cell are measured (S210). The distances between end cap blocks included in the standard cell may be measured based on location data for a macro cell and the standard cell in the chip sub-block. The end cap blocks may be located at edges of the chip sub-block and edges of the macro cell. A logic circuit block located between the end cap blocks having therebetween a distance shorter than a predetermined length is searched (S220). It is determined whether a power supply voltage line and a ground voltage line exist at a partial region of the first power mesh layer above the searched logic circuit block (S225). It may be determined whether a power supply voltage line and a ground voltage line exist at a partial region of the first power mesh layer above the searched logic circuit block based on power mesh data representing a voltage line structure in the first through N-th power mesh layers. When the power supply voltage line or the ground voltage line does not exist at the partial region, the power mesh data are modified to supplement the power supply voltage line or the ground voltage line at the partial region (S230). When the searched logic circuit block includes a header cell that generates a virtual power supply voltage, a virtual power supply voltage line for applying the virtual power supply voltage may be supplemented in the signal connection layer included in the searched logic circuit block (S240).

In some exemplary embodiments of the present inventive concept, when the power supply voltage line or the ground voltage line exists at the partial region, the power mesh data may be modified to modify the power supply voltage line or the ground voltage line (S250).

In some exemplary embodiments of the present inventive concept, to modify the power mesh data to supplement the power supply voltage line or the ground voltage line at the partial region (S230), the power supply voltage line may be supplemented at the partial region when the partial region does not include the power supply voltage line (S131), and the ground voltage line may be supplemented at the partial region when the partial region does not include the ground voltage line (S132).

In some exemplary embodiments of the present inventive concept, to modify the power mesh data to supplement the power supply voltage line or the ground voltage line at the partial region (S230), an additional power supply voltage line or an additional ground voltage line may be added at the partial region (S133).

In some exemplary embodiments of the present inventive concept, to modify the power mesh data to supplement the power supply voltage line or the ground voltage line at the partial region (S230), the power supply voltage line or the ground voltage line located at another region of the first power mesh layer may be moved from the another region to the partial region (S134).

Figure 14:
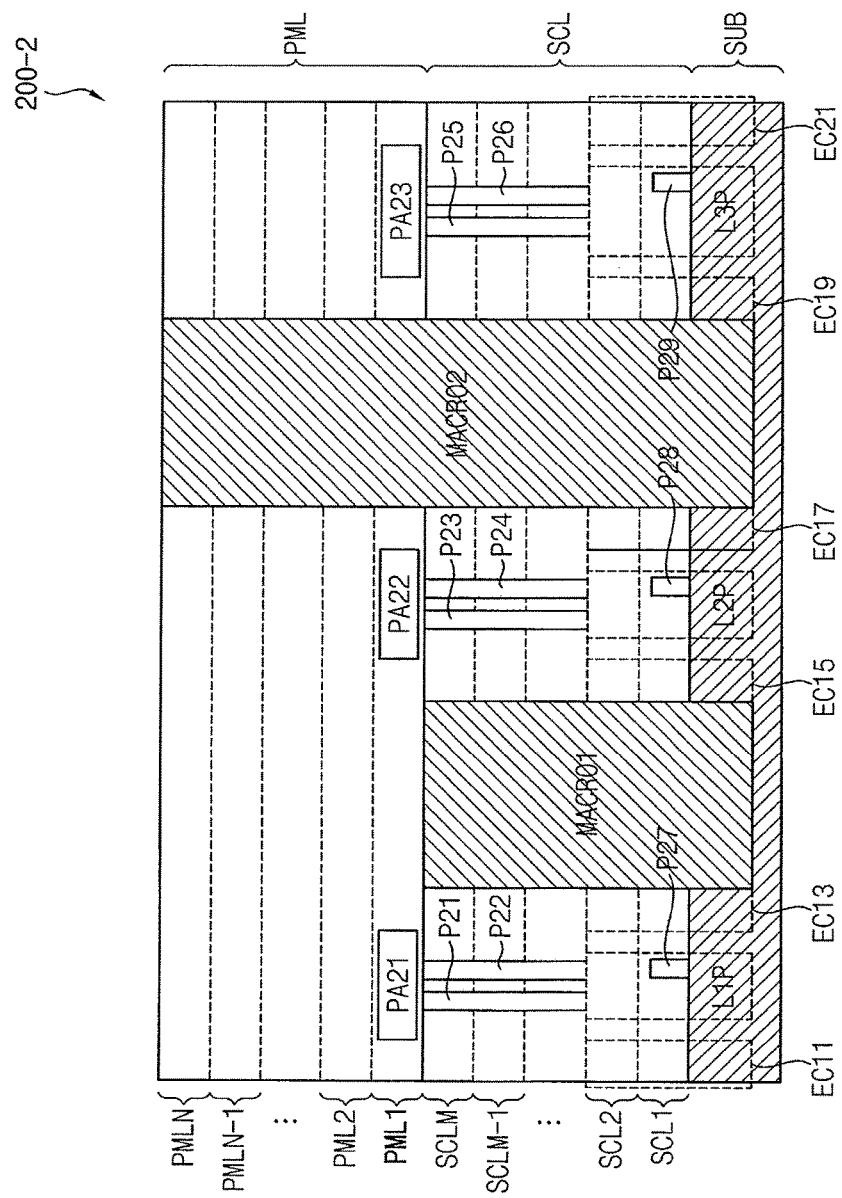
FIG. 14 is a cross-sectional view of another example of a first chip sub-block taken along a line A-B of FIG. 7.

FIG. 14 is a cross-sectional view of another example of a first chip sub-block taken along a line A-B of FIG. 7.

A first chip sub-block 200-2 may be substantially the same as a first chip sub-block 200-1, except that first through third logic circuit blocks L1P, L2P and L3P may include first through third virtual power supply voltage lines P27, P28 and P29, respectively.

Each of the first through third logic circuit blocks L1P, L2P and L3P may include a header cell that generates a virtual power supply voltage. The virtual power supply voltage generated by the header cell included in the first logic circuit block L1P may be transferred to other standard cells through the first virtual power supply voltage line P27 in the first signal connection layer SCL1, the virtual power supply voltage generated by the header cell included in the second logic circuit block L2P may be transferred to other standard cells through the second virtual power supply voltage line P28 in the first signal connection layer SCL1, and the virtual power supply voltage generated by the header cell included in the third logic circuit block L3P may be transferred to other standard cells through the third virtual power supply voltage line P29 in the first signal connection layer SCL1. The first through third virtual power supply voltage lines P27, P28 and P29 may be located in the first signal connection layer SCL1; however, exemplary embodiments of the present inventive concept are not limited thereto. In some exemplary embodiments of the present inventive concept, each virtual power supply voltage line P27, P28 and P29 may be located at another signal connection layer, such as signal connection layers SCL2, SCLM-1 and SCLM.

Figure 15:
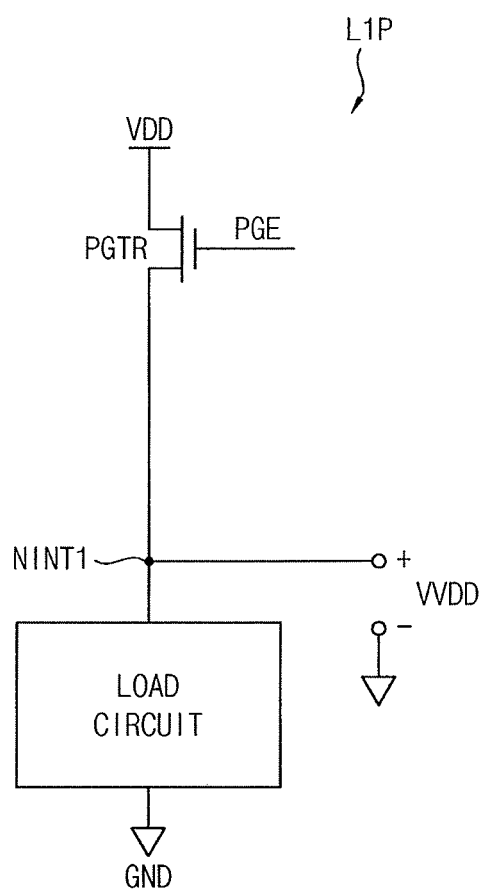
FIG. 15 is a circuit diagram illustrating an equivalent circuit of a first logic circuit block included in a first chip sub-block of FIG. 14.

FIG. 15 is a circuit diagram illustrating an equivalent circuit of a first logic circuit block included in a first chip sub-block of FIG. 14. Configurations of the second and third logic circuit blocks L2P and L3P will be understood based on the following description for the first logic circuit block L1P, and thus duplicative descriptions for the second and third logic circuit blocks L2P and L3P may be omitted.

Referring to FIG. 15, the first logic circuit block L1P may include a header transistor PGTR, which may be the header cell, and a load circuit LOAD CIRCUIT.

A drain of the header transistor PGTR may be connected to a power supply voltage VDD, a gate of the header transistor PGTR may receive a power gate enable signal PGE, and a source of the header transistor PGTR may be connected to a first internal node NINT1. The load circuit LOAD CIRCUIT may be to the first internal node NINT1 and a ground voltage GND.

When the power gate enable signal PGE is activated, the header transistor PGTR may generate a virtual power supply voltage VVDD at the first internal node NINT1 based on the power supply voltage VDD. The load circuit LOAD CIRCUIT may operate based on the virtual power supply voltage VVDD. The virtual power supply voltage VVDD may be applied to the first power supply voltage line P27.

Figure 16:
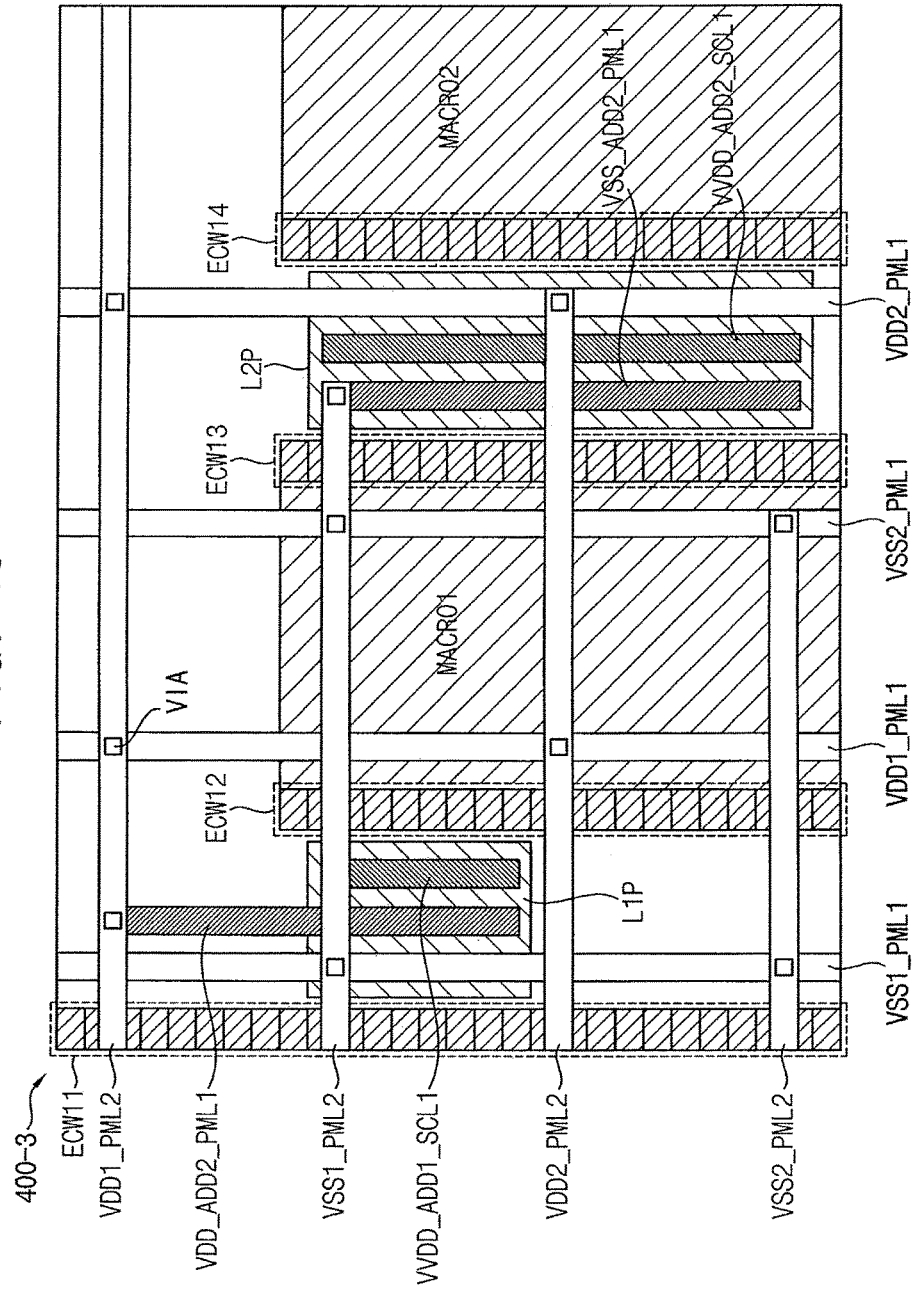
FIG. 16 is a plan view illustrating another example of a first chip sub-block where a power mesh for the first chip sub-block of FIG. 9 is modified.

FIG. 16 is a plan view illustrating another example of a first chip sub-block where a power mesh for the first chip sub-block of FIG. 9 is modified.

Referring to FIG. 16, to supplement the power supply voltage line or the ground voltage line at the partial region (S230), an additional power supply voltage line VDD_ADD2_PML1 may be added at a first partial region PA11, and/or an additional ground voltage line VSS_ADD2_PML1 may be added at a second partial region PA12. For example, the additional power supply voltage line VDD_ADD2_PML1 and/or the additional ground voltage line VSS_ADD2_PML1 may be added to a first chip sub-block 400-3.

To supplement the virtual power supply voltage line in the signal connection layer included in the logic circuit block (S240), a first additional virtual power supply voltage line VVDD_ADD1_SCL1 may be added in the first signal connection layer SCL1 included in the first logic circuit block UP, and/or a second additional virtual power supply voltage line VVDD_ADD2_SCL1 may be added in the first signal connection layer SCL1 included in the second logic circuit block L2P.

Figure 17:
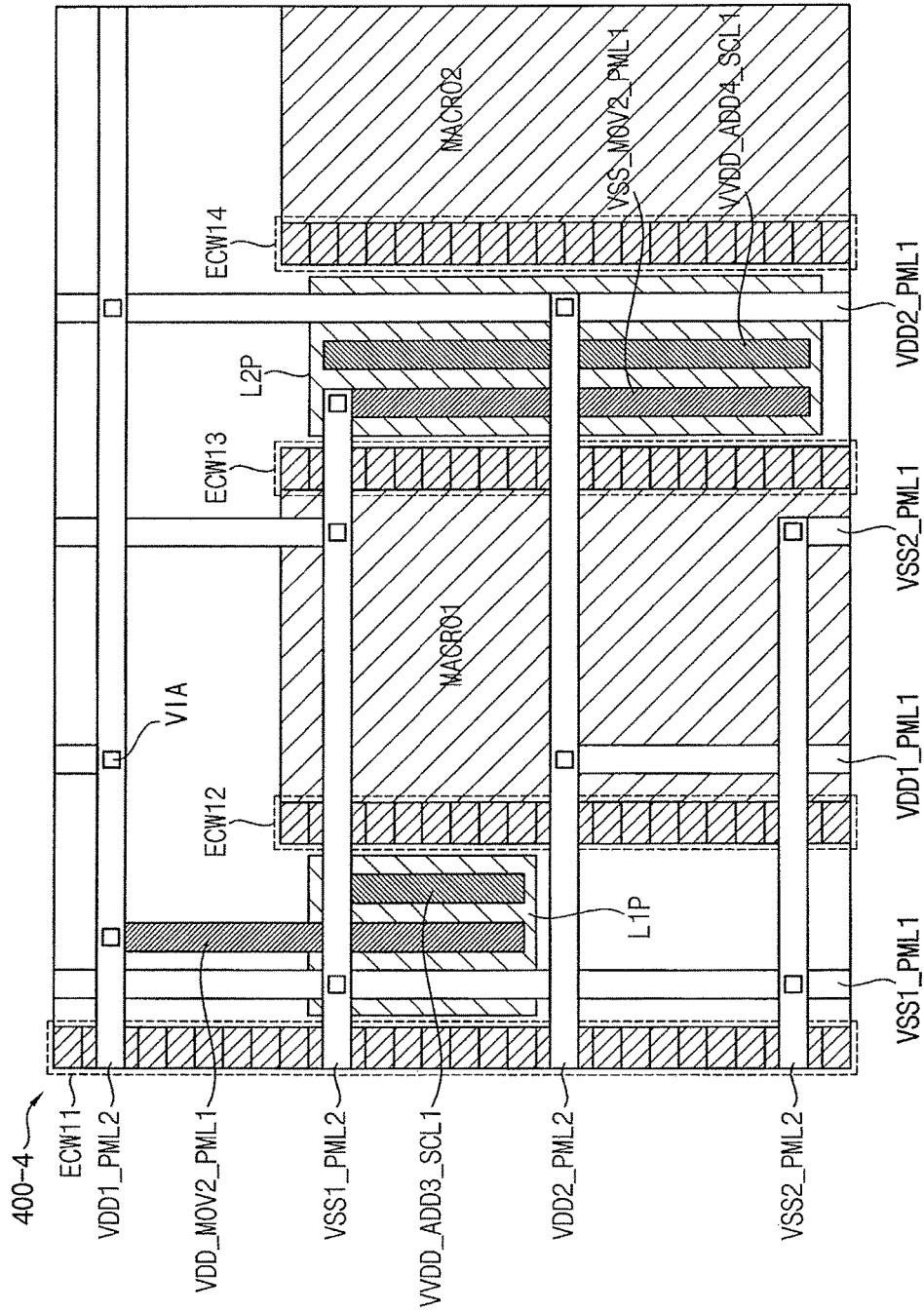
FIG. 17 is a plan view illustrating another example of a first chip sub-block where a power mesh for the first chip sub-block of FIG. 9 is modified.

FIG. 17 is a plan view illustrating another example of a first chip sub-block where a power mesh for the first chip sub-block of FIG. 9 is modified.

Referring to FIG. 17, to supplement the power supply voltage line or the ground voltage line at the partial region (S230), a portion of the first power supply voltage line VDD1_PML1 located at a region other than the first partial region PA11 may be moved to the first partial region PA11 to form a moved power supply voltage line VDD_MOV2_PML1, and/or a portion of the second ground voltage line VSS2_PML1 located at a region other than the second partial region PA12 may be moved to the second partial region PA12 to form a moved ground voltage line VSS_MOV2_PML1. For example, the moved power supply voltage line VDD_MOV2_PML1, and/or the moved ground voltage line VSS_MOV2_PML1 may be formed in a first chip sub-block 400-4.

To supplement the virtual power supply voltage line in the signal connection layer included in the logic circuit block (S240), a first additional virtual power supply voltage line VVDD_ADD3_SCL1 may be added in the first signal connection layer SCL1 included in the first logic circuit block L1P, and/or a second additional virtual power supply voltage line VVDD_ADD4_SCL1 may be added in the first signal connection layer SCL1 included in the second logic circuit block L2P.

Figure 18:
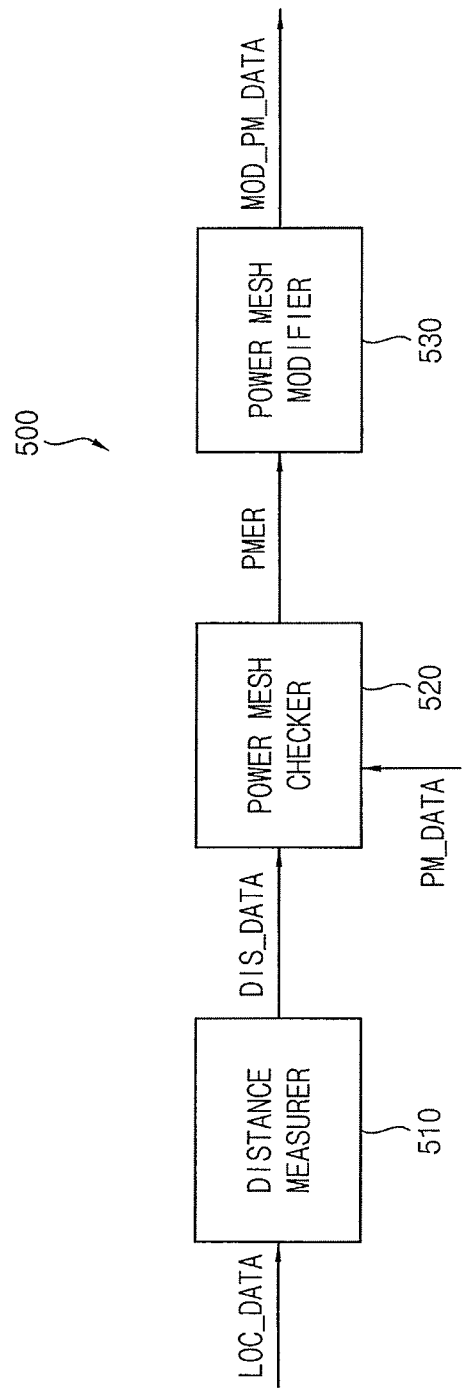
FIG. 18 is a block diagram illustrating a power mesh modifying device according to one or more exemplary embodiments of the present inventive concept.

FIG. 18 is a block diagram illustrating a power mesh modifying device according to one or more exemplary embodiments of the present inventive concept.

Referring to FIG. 18, a power mesh modifying device 500 according to one or more exemplary embodiments of the present inventive concept may include a distance measurer 510, a power mesh checker 520 and a power mesh modifier 530.

The distance measurer 510 may generate distance data DIS_DATA. The distance data DIS_DATA may be generated by measuring distances between end cap blocks that are included in a standard cell and are located at an edge of a chip sub-block and an edge of a macro cell. The distances may be measured based on location data LOC_DATA for the macro cell and the standard cell of the chip sub-block including a substrate layer, a signal connection layer and first through N-th power mesh layers.

The power mesh checker 520 may generate a power mesh existence result PMER by determining whether a power supply voltage line and a ground voltage line exist at a partial region of the first power mesh layer vertically above a logic circuit block between the end cap blocks having the distance less than a predetermined length therebetween. The existence of the power supply voltage line and the ground voltage line may be determined based on power mesh data PM_DATA representing a voltage line structure in the first through the N-th power mesh layers and the distance data DIS_DATA.

The power mesh modifier 530 may generate modified power mesh data MOD_PM_DATA. The power mesh data may be generated MOD_PM_DATA by supplementing the power supply voltage line or the ground voltage line at the partial region. Supplementing the power supply voltage line or the ground voltage line may occur when the power supply voltage line or the ground voltage line does not exist at the partial region and by modifying the power supply voltage line or the ground voltage line at the partial region when the power supply voltage line or the ground voltage line exists at the partial region.

Each of the distance measurer 510, the power mesh checker 520 and the power mesh modifier 530 may be implemented in hardware or in software. Operations of the distance measurer 510, the power mesh checker 520 and the power mesh modifier 530 will be understood based on descriptions described above with reference to FIGS. 1 through 17.

Exemplary embodiments of the present inventive concept may be applied to power-planning for configuring a power mesh in a semiconductor chip design.

While the present inventive concept has been particularly shown and described with reference to exemplary embodiments thereof, it will be understood by those of ordinary skill in the art that various changes in form and detail may be made therein without departing from the spirit and scope of the present inventive concept.

What is claimed is:

1. A method of modifying a power mesh of an integrated circuit chip, the method comprising:
    measuring distances between end cap blocks included in a standard cell based on location data for a macro cell and the standard cell in a chip sub-block included in the integrated circuit chip, wherein the chip sub-block includes a substrate layer, a signal connection layer and first through N-th power mesh layers, wherein N is a natural number, and wherein the end cap blocks are located at edges of the chip sub-block and edges of the macro cell;
    searching a logic circuit block located between first and second end cap blocks of the end cap blocks, wherein a distance between the first and second end cap blocks is shorter than a predetermined length;
    determining whether a power supply voltage line and a ground voltage line exist at a partial region of the first power mesh layer above the searched logic circuit block based on power mesh data representing a voltage line structure in the first through N-th power mesh layers; and
    when the power supply voltage line or the ground voltage line is determined not to exist at the partial region, modifying the power mesh data to supplement the power supply voltage line or the ground voltage line at the partial region wherein the power mesh of the integrated circuit chip is modified based on the modified power mesh data, wherein the modified integrated circuit chip includes the supplemented power supply voltage line or the ground voltage line at the partial region.

2. The method of claim 1, further comprising:
    when the power supply voltage line or the ground voltage line is determined to exist at the partial region, modifying the power mesh data to modify the power supply voltage line or the ground voltage line at the partial region.

3. The method of claim 1, wherein modifying the power mesh data to supplement the power supply voltage line or the ground voltage line at the partial region comprises:
    when the partial region does not include the power supply voltage line, supplementing the power supply voltage line at the partial region; and
    when the partial region does not include the ground voltage line, supplementing the ground voltage line at the partial region.

4. The method of claim 1, wherein modifying the power mesh data to supplement the power supply voltage line or the ground voltage line at the partial region comprises:
adding an additional power supply voltage line or an additional ground voltage line at the partial region.

5. The method of claim 1, wherein modifying the power mesh data to supplement the power supply voltage line or the ground voltage line at the partial region comprises:
moving the power supply voltage line or the ground voltage line located at another region of the first power mesh layer from the another region to the partial region.

6. The method of claim 1, wherein measuring the distances between the end cap blocks comprises:
measuring the distance between the end cap block located at the edge of the chip sub-block and the end cap block located at the edge of macro cell; and
measuring the distance between the end cap blocks located at the edges of macro cells.

7. The method of claim 1, wherein the end cap blocks are configured to increase sizes of N-wells located under the edges of the chip sub-block and the edges of the macro cell.

8. The method of claim 1, wherein the signal connection layer is located on the substrate layer,
wherein the first power mesh layer is located on the signal connection layer, and
wherein a (K+1)-th one of the first through N-th power mesh layers is located on a K-th one of the first through N-th power mesh layer, and wherein K is a natural number less than N.

9. The method of claim 1, wherein the macro cell is in contact with the substrate layer, the signal connection layer and the first through N-th power mesh layers, and wherein the macro cell has a fixed internal signal connection structure.

10. The method of claim 1, wherein the macro cell is a memory cell, a digital IP or an analog IP.

11. The method of claim 1, wherein the standard cell is in contact with the substrate layer and the signal connection layer, and wherein the standard cell transmits or receives a signal through the signal connection layer.

12. The method of claim 1, wherein the power supply voltage lines in the first through N-th power mesh layers are connected through first vias,
wherein the ground voltage lines in the first through N-th power mesh layers are connected through second vias, and
wherein the logic circuit block is connected to the power supply voltage line and the ground voltage line in the first power mesh layer through third vias passing through the signal connection layer.

13. The method of claim 1, wherein the logic circuit block is included in the standard cell.

14. A method of modifying a power mesh of an integrated circuit chip, the method comprising:
measuring distances between end cap blocks included in a standard cell based on location data for a macro cell and the standard cell in a chip sub-block included in the integrated circuit chip, wherein the chip sub-block includes a substrate layer, a signal connection layer and first through N-th power mesh layers, wherein N is a natural number, and wherein the end cap blocks are located at edges of the chip sub-block and edges of the macro cell;
searching a logic circuit block located between first and second end cap blocks of the end cap blocks, wherein a distance between the first and second end cap blocks is shorter than a predetermined length;
determining whether a power supply voltage line and a ground voltage line exist at a partial region of the first power mesh layer above the searched logic circuit block based on power mesh data representing a voltage line structure in the first through N-th power mesh layers;
when the power supply voltage line or the ground voltage line is determined not to exist at the partial region, modifying the power mesh data to supplement the power supply voltage line or the ground voltage line at the partial region wherein the power mesh of the integrated circuit chip is modified based on the modified power mesh data, wherein the modified integrated circuit chip includes the supplemented power supply voltage line or the ground voltage line at the partial region; and
when the searched logic circuit block includes a header cell that generates a virtual power supply voltage, modifying the power mesh data to supplement a virtual power supply voltage line for applying the virtual power supply voltage in the signal connection layer included in the searched logic circuit block wherein the power mesh of the integrated circuit chip is modified based on the modified power mesh data, wherein the modified integrated circuit chip includes the supplemented virtual power supply voltage line in the signal connection layer included in the searched logic circuit block.

15. The method of claim 14, further comprising:
when the power supply voltage line or the ground voltage line is determined to exist at the partial region, modifying the power mesh data to modify the power supply voltage line or the ground voltage line at the partial region.

16. The method of claim 14, wherein modifying the power mesh data to supplement the power supply voltage line or the ground voltage line at the partial region comprises:
when the partial region does not include the power supply voltage line, supplementing the power supply voltage line at the partial region; and
when the partial region does not include the ground voltage line, supplementing the ground voltage line at the partial region.

17. The method of claim 14, wherein modifying the power mesh data to supplement the power supply voltage line or the ground voltage line at the partial region comprises:
adding an additional power supply voltage line or an additional ground voltage line at the partial region.

18. The method of claim 14, wherein modifying the power mesh data to supplement the power supply voltage line or the ground voltage line at the partial region comprises:
moving the power supply voltage line or the ground voltage line located at another region of the first power mesh layer from the another region to the partial region.

19. The method of claim 14, wherein measuring the distances between the end cap blocks comprises:
measuring the distance between the end cap block located at the edge of the chip sub-block and the end cap block located at the edge of macro cell; and
measuring the distance between the end cap blocks located at the edges of macro cells.

* * * * *